US010811884B2

(12) United States Patent
Frey et al.

(10) Patent No.: US 10,811,884 B2
(45) Date of Patent: Oct. 20, 2020

(54) CONSOLIDATION AND USE OF POWER RECOVERED FROM A TURBINE IN A PROCESS UNIT

(71) Applicant: UOP LLC, Des Plaines, IL (US)

(72) Inventors: Stanley Joseph Frey, Palatine, IL (US); Gregory A. Schwarzkopf, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 15/923,945

(22) Filed: Mar. 16, 2018

(65) Prior Publication Data

US 2019/0288517 A1    Sep. 19, 2019

(51) Int. Cl.
*H02J 3/46* (2006.01)
*F01K 23/06* (2006.01)
*F01D 17/16* (2006.01)

(52) U.S. Cl.
CPC ............ *H02J 3/46* (2013.01); *F01D 17/16* (2013.01); *F01K 23/064* (2013.01); *F05D 2220/31* (2013.01); *F05D 2220/62* (2013.01); *F05D 2220/764* (2013.01)

(58) Field of Classification Search
CPC .......... H02J 3/46; F01D 17/16; F01K 23/064; F05D 2220/31; F05D 2220/62; F05D 2220/764
USPC ................................ 290/52, 54; 166/244.1
See application file for complete search history.

(56) References Cited

U.S. PATENT DOCUMENTS

| | | | | |
|---|---|---|---|---|
| 1,901,776 A | * | 3/1933 | Ring | F03B 15/12 |
| | | | | 415/21 |
| 2,123,120 A | * | 7/1938 | Reiffenstein | F03B 3/186 |
| | | | | 415/129 |
| 2,436,683 A | * | 2/1948 | Wood, Jr. | H02K 5/128 |
| | | | | 290/43 |
| 2,828,066 A | * | 3/1958 | Wellauer | F04D 25/024 |
| | | | | 417/323 |
| 2,854,963 A | * | 10/1958 | Spier | F02B 71/00 |
| | | | | 123/46 R |
| 2,874,585 A | * | 2/1959 | Lasley | G05D 13/00 |
| | | | | 74/336.5 |

(Continued)

FOREIGN PATENT DOCUMENTS

| | | |
|---|---|---|
| CN | 102203780 A | 9/2011 |
| CN | 103917280 A | 7/2014 |

(Continued)

OTHER PUBLICATIONS

Harris, James W., et al., U.S. Appl. No. 15/924,034, filed Mar. 16, 2018 and entitled "Use of Recovered Power in a Process".

(Continued)

*Primary Examiner* — Pedro J Cuevas

(57) ABSTRACT

Apparatus and methods for recovering energy in a petroleum, petrochemical, or chemical plant as described. The apparatus includes a fluid process stream flowing through a petroleum, petrochemical, or chemical process zone. There are at least one variable-resistance power-recovery turbine, a portion of the first process stream flowing through the first power-recovery turbine to generate electric power as direct current therefrom. There is a single DC to AC inverter electrically connected to at least one power-recovery turbine, and the output of the DC to AC inverter electrically connected to a first substation.

23 Claims, 2 Drawing Sheets

(56) References Cited

U.S. PATENT DOCUMENTS

| | | | | |
|---|---|---|---|---|
| 3,236,498 | A * | 2/1966 | Kerensky | F03B 3/183 290/43 |
| 3,466,871 | A * | 9/1969 | Osborn, Jr. | F01K 23/02 60/655 |
| 3,756,739 | A * | 9/1973 | Boussuges | F03B 3/103 415/161 |
| 3,777,479 | A * | 12/1973 | Hagen | F02C 9/54 60/39.25 |
| 3,891,860 | A * | 6/1975 | Hutarew | F03B 13/06 290/52 |
| 4,037,655 | A * | 7/1977 | Carpenter | E21B 36/00 166/245 |
| 4,057,736 | A * | 11/1977 | Jeppson | F01K 13/00 290/1 R |
| 4,170,874 | A * | 10/1979 | Kyrklund | F01D 5/142 415/160 |
| 4,183,209 | A * | 1/1980 | Kronogard | F01D 17/14 415/161 |
| 4,285,481 | A | 8/1981 | Biscomb | |
| 4,406,577 | A * | 9/1983 | Ichikawa | F03B 3/106 415/1 |
| 4,455,614 | A | 6/1984 | Martz et al. | |
| 4,531,888 | A * | 7/1985 | Buchelt | F03B 3/04 415/148 |
| 4,547,123 | A * | 10/1985 | Ichikawa | F03B 3/106 415/1 |
| 4,563,130 | A * | 1/1986 | Ichikawa | F01D 5/026 416/213 R |
| 4,692,090 | A * | 9/1987 | Naka | F03B 3/106 415/112 |
| 4,702,081 | A * | 10/1987 | Vinko | F01K 23/06 60/655 |
| 5,209,634 | A * | 5/1993 | Owczarek | F01D 25/30 415/150 |
| 5,384,489 | A | 1/1995 | Bellac | |
| 5,457,952 | A * | 10/1995 | Almhem | F01K 23/062 60/39.25 |
| 5,481,145 | A | 1/1996 | Canders et al. | |
| 5,498,128 | A * | 3/1996 | Baets | F01D 17/165 415/164 |
| 5,518,365 | A * | 5/1996 | Baets | F01D 17/165 415/160 |
| 6,011,334 | A * | 1/2000 | Roland | H02K 7/11 290/43 |
| 6,094,909 | A * | 8/2000 | Weber | F01N 3/303 60/280 |
| 6,216,463 | B1 * | 4/2001 | Stewart | F03G 7/04 210/170.01 |
| 6,265,453 | B1 | 7/2001 | Kennedy | |
| 6,354,084 | B1 | 3/2002 | McKinley et al. | |
| 6,554,074 | B2 * | 4/2003 | Longbottom | E21B 41/0085 166/372 |
| 6,607,030 | B2 * | 8/2003 | Bauer | E21B 41/0085 166/65.1 |
| 6,672,061 | B2 * | 1/2004 | Schmid | F02B 37/02 123/568.17 |
| 6,681,155 | B1 | 1/2004 | Fujita et al. | |
| 6,820,689 | B2 * | 11/2004 | Sarada | E21B 41/0057 166/244.1 |
| 6,898,540 | B2 | 5/2005 | Davies | |
| 7,002,261 | B2 * | 2/2006 | Cousins | E21B 41/0085 290/43 |
| 7,062,359 | B2 | 6/2006 | Bjorklund | |
| 7,141,901 | B2 * | 11/2006 | Spring | E21B 4/04 310/77 |
| 7,461,508 | B2 * | 12/2008 | Rosin | F02D 41/1448 123/562 |
| 7,579,703 | B2 * | 8/2009 | Shifrin | F03B 13/105 290/52 |
| 7,632,040 | B2 * | 12/2009 | Cripps | E02B 9/00 290/1 R |
| 7,757,493 | B2 | 7/2010 | Bell et al. | |
| 7,946,789 | B2 * | 5/2011 | Cripps | E02B 9/00 290/1 R |
| 7,948,101 | B2 | 5/2011 | Burtch | |
| 8,141,360 | B1 * | 3/2012 | Huber | B60K 6/24 60/606 |
| 8,404,918 | B2 | 3/2013 | Frey | |
| 8,485,783 | B2 * | 7/2013 | Lundbladh | F02C 9/20 416/128 |
| 8,510,015 | B2 | 8/2013 | Beausoleil et al. | |
| H2289 | H * | 2/2014 | Kennedy | 384/481 |
| 8,680,704 | B1 * | 3/2014 | Rooney | F03B 13/02 290/54 |
| 8,763,625 | B1 | 7/2014 | Carter | |
| 8,826,639 | B2 * | 9/2014 | Simpkin | F02C 1/06 165/104.13 |
| 8,967,590 | B2 | 3/2015 | Minervini et al. | |
| 8,985,967 | B2 * | 3/2015 | Gudivada | F04D 13/043 415/1 |
| 9,068,468 | B2 * | 6/2015 | Simpkin | F02C 1/06 |
| 9,085,499 | B2 | 7/2015 | Frey et al. | |
| 9,235,228 | B2 | 1/2016 | Gazit et al. | |
| 9,677,015 | B2 | 6/2017 | Gupta et al. | |
| 9,752,460 | B2 | 9/2017 | Bowan | |
| 9,764,272 | B2 | 9/2017 | Martin et al. | |
| 10,246,645 | B2 | 4/2019 | Froehle et al. | |
| 10,260,415 | B2 * | 4/2019 | Simpkin | F02C 1/05 |
| 10,508,568 | B2 * | 12/2019 | Frey | F01K 7/165 |
| 2003/0154717 | A1 * | 8/2003 | Schmid | F02B 37/02 60/605.2 |
| 2004/0011523 | A1 * | 1/2004 | Sarada | E21B 41/0057 166/244.1 |
| 2005/0034463 | A1 | 2/2005 | Simpson et al. | |
| 2006/0054318 | A1 * | 3/2006 | Sarada | E21B 41/0057 166/266 |
| 2006/0056120 | A1 | 3/2006 | Kawamura et al. | |
| 2006/0123782 | A1 * | 6/2006 | Rosin | F02D 41/1448 60/599 |
| 2008/0015839 | A1 | 1/2008 | Noureldin et al. | |
| 2008/0017369 | A1 * | 1/2008 | Sarada | E21B 43/40 166/244.1 |
| 2008/0238105 | A1 * | 10/2008 | Ortiz | B60K 6/485 290/54 |
| 2008/0290663 | A1 * | 11/2008 | Shifrin | F03B 13/105 290/52 |
| 2009/0125152 | A1 | 5/2009 | Skowronski et al. | |
| 2010/0019496 | A1 * | 1/2010 | Yu | F01D 15/10 290/52 |
| 2010/0154428 | A1 * | 6/2010 | Yu | F01K 23/068 60/772 |
| 2010/0301617 | A1 * | 12/2010 | Lundbladh | F02C 3/067 290/1 R |
| 2011/0077448 | A1 | 3/2011 | Frey | |
| 2011/0100004 | A1 | 5/2011 | Al-Mazeedi | |
| 2012/0107227 | A1 | 5/2012 | Fischer et al. | |
| 2012/0118526 | A1 | 5/2012 | Sudau et al. | |
| 2012/0227440 | A1 | 9/2012 | Guidati et al. | |
| 2012/0245754 | A1 | 9/2012 | Mehnert | |
| 2012/0260667 | A1 | 10/2012 | Chillar et al. | |
| 2012/0326443 | A1 * | 12/2012 | Vince | F01D 15/10 290/7 |
| 2013/0019530 | A1 | 1/2013 | Favilli et al. | |
| 2013/0025275 | A1 * | 1/2013 | Baeuerle | F02B 37/24 60/605.1 |
| 2013/0199185 | A1 | 8/2013 | Wain et al. | |
| 2014/0053560 | A1 * | 2/2014 | Simpkin | F02C 1/06 60/726 |
| 2014/0099191 | A1 * | 4/2014 | Kotzbacher | F01D 17/165 415/159 |
| 2014/0331672 | A1 | 11/2014 | Filippi et al. | |
| 2014/0338335 | A1 * | 11/2014 | Simpkin | F02C 1/06 60/726 |
| 2015/0118131 | A1 | 4/2015 | Martin et al. | |
| 2015/0159547 | A1 * | 6/2015 | Bakula | F02B 37/22 417/244 |
| 2015/0275697 | A1 * | 10/2015 | Simpkin | F02C 1/06 60/791 |

(56) References Cited

U.S. PATENT DOCUMENTS

| | | | |
|---|---|---|---|
| 2016/0024999 A1* | 1/2016 | Grabowska | F02B 37/22 |
| | | | 60/602 |
| 2016/0079756 A1 | 3/2016 | Ikeyama et al. | |
| 2016/0141878 A1 | 5/2016 | Johansen | |
| 2016/0161536 A1 | 6/2016 | Amminudin | |
| 2016/0252015 A1 | 9/2016 | Kusumi et al. | |
| 2016/0319198 A1 | 11/2016 | Quanci et al. | |
| 2017/0058206 A1 | 3/2017 | Noureldin et al. | |
| 2017/0058207 A1 | 3/2017 | Noureldin et al. | |
| 2019/0199128 A1 | 6/2019 | Neufeld et al. | |
| 2019/0284488 A1* | 9/2019 | Frey | F01K 25/14 |
| 2019/0284962 A1* | 9/2019 | Frey | F01K 23/064 |
| 2019/0284964 A1* | 9/2019 | Frey | F01K 13/006 |
| 2019/0286072 A1* | 9/2019 | Frey | H02J 13/00002 |
| 2020/0056509 A1* | 2/2020 | Frey | C10G 65/02 |

FOREIGN PATENT DOCUMENTS

| | | |
|---|---|---|
| CN | 104463341 A | 3/2015 |
| CN | 206538206 | 10/2017 |
| EP | 0552039 | 7/1993 |
| EP | 2778354 A1 | 9/2014 |
| FR | 2414162 | 8/1979 |
| RU | 2014114067 | 10/2015 |
| WO | 2007105976 A1 | 9/2007 |
| WO | 2007053036 A1 | 10/2007 |
| WO | 2012128928 A1 | 9/2012 |
| WO | 2013148175 A1 | 10/2013 |
| WO | 2014119569 A1 | 8/2014 |
| WO | 2014178079 A2 | 11/2014 |
| WO | 2015065949 A1 | 5/2015 |
| WO | 2016177376 A1 | 11/2016 |
| WO | 2018005184 A1 | 1/2018 |

OTHER PUBLICATIONS

Frey, Stanley J., et al., U.S. Appl. No. 62/644,086, filed Mar. 16, 2018 and entitled "System for Consolidation and Use of Power Recovered from a Turbine in a Process Unit".

Frey, Stanley J., et al., U.S. Appl. No. 62/644,104, filed Mar. 16, 2018 and entitled "System for Power Recovery from Quench and Dilution Vapor Streams".

Frey, Stanley Joseph, et al., U.S. Appl. No. 15/924,037, filed Mar. 16, 2018 and entitled "Power Recovery from Quench and Dilution Vapor Streams".

Frey, Stanley J., U.S. Appl. No. 15/923,936, filed Mar. 16, 2018 and entitled "Energy-Recovery Turbines for Gas Streams".

Harris, James W., et al., U.S. Appl. No. 15/923,995, filed Mar. 16, 2018 and entitled "Steam Reboiler with Turbine".

Frey, Stanley J., et al., U.S. Appl. No. 15/923,964, filed Mar. 16, 2018 and entitled "Process Improvement through the Addition of Power Recovery Turbine Equipment in Existing Processes".

Frey, Stanley Joseph, et al., U.S. Appl. No. 15/923,978, filed Mar. 16, 2018 and entitled "Hydroprocessing Unit with Power Recovery Turbines".

Frey, Stanley Joseph, et al., U.S. Appl. No. 15/923,990, filed Mar. 16, 2018 and entitled "Turbine with Supersonic Separation".

Frey, Stanley Joseph, et al., U.S. Appl. No. 15/923,997, filed Mar. 16, 2018 and entitled "Processes for Adjusting at Least One Process Condition of a Chemical Processing Unit with a Turbine".

Tsourapas, Vasilios, Control Analysis of Integrated Fuel Cell Systems with Energy Recuperation Devices, 2007.

The Elliot Group, Maximize the Efficiency of your Steam Process, 2014.

U.S. Department of Energy, Replace Pressure-Reducing Valves with Backpressure Turbogenerators.

Mechanical Solutions, Inc., Replacing a Pressure Reducing Valve with a Hydro Turbine for a Municipal Water Supply, Jul. 19, 2016.

International Search Report from corresponding PCT application No. PCT/US2019/022431, dated Jun. 20, 2019.

Mohammadzadeh, Ashkan, et al., Design of a wind turbine model for clean energy. Case study: Khorasan Razavi regional electricity company, Acta Technica, 62, No. 4B/2017-1-8. International Search Report from corresponding PCT application No. PCT/US2019/022424, dated May 23, 2019.

Guitiérrez-Antonio, Claudia, et al, Intensification of the hydrotreating process to produce renewable aviation fuel through reactive distillation, Science Direct, vol. 124, Feb. 2018.

Written Opinion from corresponding PCT application No. PCT/US2019/022431, dated May 15, 2019.

* cited by examiner

CONSOLIDATION AND USE OF POWER RECOVERED FROM A TURBINE IN A PROCESS UNIT

Typically, when power-recovery turbines are installed in process streams in petroleum, petrochemical, and chemical process plant, the power is sent through mechanical means to a driver for a pump or compressor because this generally has a higher efficiency than conversion to electricity through a generator. However, these systems have lower reliability than an electrical generator, require that power recovered matches closely with the power consumed in a single driver, and require a lot of connection equipment in couplings, gears, switchgear, clutches, and the like that all must be in a limited space. These issues have been addressed by generating electrical power at the power recovery point and providing that as fungible power for any driver within the process unit. Where power recovery is greater than that consumed within the process unit, it must be exported into the higher voltage level on the plant grid. This has been the case for most major power recovery installations seen to date.

However, sending power to the plant's power grid presents its own set of difficulties. It requires several steps of electricity conditioning, voltage transformation and frequency regulation. Now higher technology equipment is available in the power recovery field that can bring down unit cost to allow economic power recovery at lower power generation sources. When more cost efficient turbines are installed as control elements in process streams, multiple installations may be desirable. However, the power conditioning, transformer, electrical components and safety equipment to protect the high voltage grid is costly for multiple installations.

Therefore, there is a need for improved electricity handling processes and apparatus for using power-recovery turbines.

DETAILED DESCRIPTION

Figure 1:
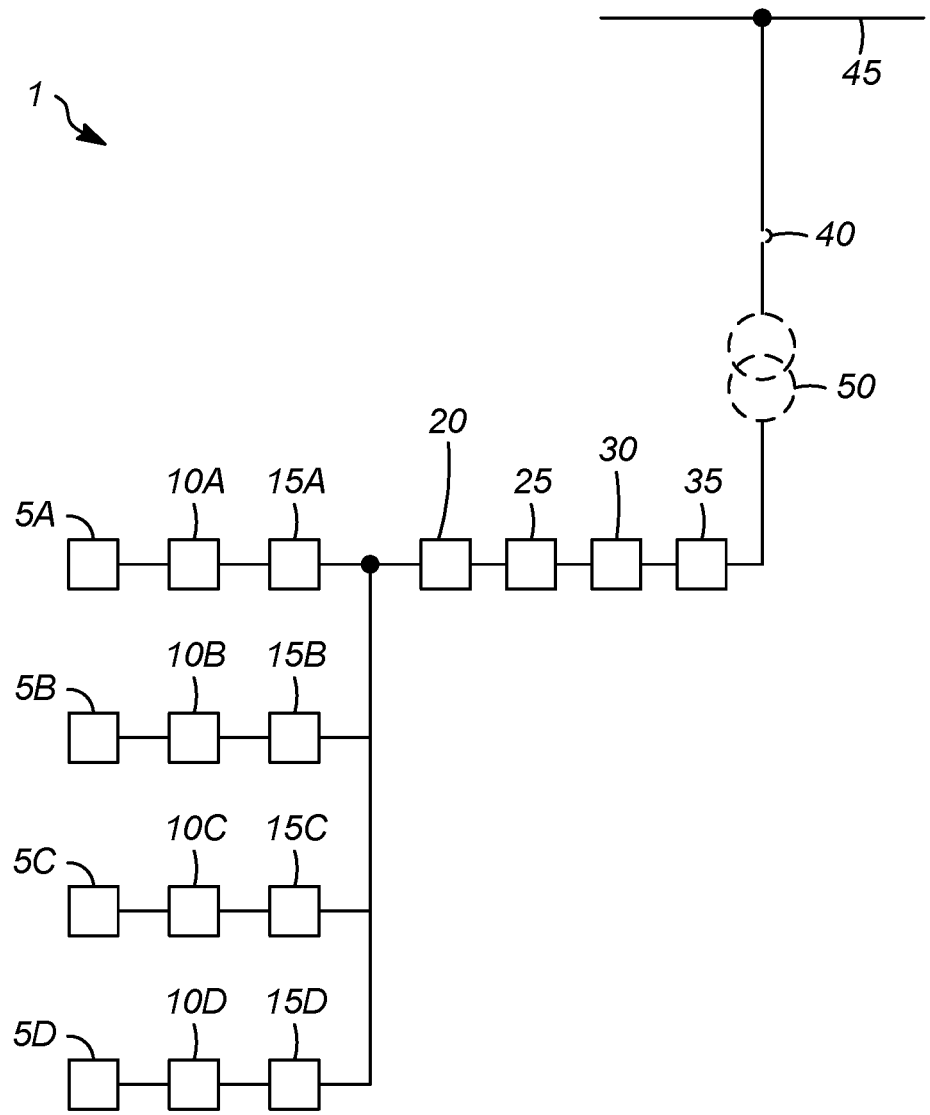
FIG. 1 is an electrical connection diagram of one embodiment of the present invention.

The invention relates to recovering power in petroleum, petrochemical, or chemical plants by producing electrical power including one or more power-recovery turbine generators. The power-recovery turbines can be used as control elements in the process. The power outputs of the turbine generators are combined and conditioned before being connected to a three-phase low voltage (for example, <600VAC, such as 480 or 240 VAC) distribution system. Delivering power at the low voltage avoids the equipment capital costs of step-up transformation and medium voltage (for example, 5 kVAC or 15 kVAC class) switchgear and protective relaying. This approach saves equipment capital expense, plot space, field cable runs, maintenance costs, and increases reliability.

Installation of power recovery turbines in petroleum, petrochemical, or chemical processing units is limited due to capital expense, plot area, cost for cable runs, space in the switchgear lineup, and equipment needed to transform the power up from low voltage (e.g., <600VAC) to the medium voltage (e.g., 5 kVAC or 15 kVAC class). Until recently, there has been a lack of smaller power recovery units (e.g., <500 kW recovered power) that are economical and practical with respect to the space required for the necessary equipment. As a result, only large electrical power recovery generators have been installed, meaning the electrical power generated must be exported from the unit (for example, fluid catalytic cracking (FCC) flue gas power recovery turbines).

In some embodiments, the cost of transforming the electricity up to a higher grid voltage is completely avoided by producing AC power at the low voltage (e.g., <600VAC) level of the drivers used in the process unit itself. In this way, the amount of power drawn from the grid is reduced as the net power draw of the process unit on the plant grid bus is reduced by the amount of power produced by the power recovery unit. This is particularly interesting for very cost efficient, compact, small scale power recovery units which will generate less power than is consumed within the process unit. In other embodiments, a portion of the electricity is converted to a higher voltage.

The use of a cost effective power recovery device such as disclosed in U.S. Pat. No. 5,481,145 allows the economical recovery of electrical power from otherwise wasted energy (such as control valve letdowns) with good payback. However, in order to maintain a low new unit or revamp cost for the application and to allow for minimal perturbation to the plant electrical system, the electrical transmission from the power recovery device should be limited to the AC bus within the process substation electrical distribution system and conform to the same low voltage (e.g., <600VAC) and frequency and phase pattern therein. It is desirable for the power recovery device, which could act as a flow controller and thereby have fluctuating current, voltage and frequency output in AC mode, to operate decoupled from the constraints of synchronizing up to the low voltage (e.g., <600VAC) grid. One way to accomplish this is to rectify the power-recovery turbine power to DC current and then have a dedicated AC inverter to synchronize the output voltage with the process low voltage AC bus.

One aspect of the invention is an apparatus for recovering energy in a petroleum, petrochemical, or chemical plant. In one embodiment, the apparatus comprises a petroleum, petrochemical, or chemical process zone; at least a first fluid process stream flowing through the process zone; at least a first variable-resistance power-recovery turbine, a portion of the first process stream flowing through the first power-recovery turbine to generate electric power as direct current therefrom; a single DC to AC inverter electrically connected to the first power-recovery turbine, the output of the DC to AC inverter electrically connected to a first substation, such as three-phase, low voltage (e.g., <600VAC) power grid. The fluid process stream can be liquid or gas, or mixtures thereof.

A process substation is an electrical area dedicated to electrical power distribution to a group of process unit services. There are typically several process and utility substations within a refinery, or petrochemical or chemical plant, and there is one main substation where the main distribution system is located. The process substation is comprised of transformers, an electrical building, switchgear of different voltage levels, motor control centers (MCCs) and single phase distribution panels. Most process substations serve a very large kW electrical load, some of it at low voltage (e.g., <600V) and some of it at medium voltage (for the larger motors, for example, ≥250 HP). As a result, a typical process substation will have both medium and low voltage buses.

When power is recovered, the output of the inverter can be connected to the process substation's low voltage distribution system or, if a sufficiently large amount of power is recovered, it can be stepped-up to the process substation's medium voltage distribution system. Large amounts of recovered power with stepped-up voltage can also be connected to medium voltage systems in other process substations or in the main substation (medium voltage is generally used to reduce voltage drop). However, this incurs additional costs of transformation, switchgear, cabling, etc. and requires significant real estate for the additional equipment.

In some embodiments, the first substation is electrically connected to a piece of equipment in the process zone.

In some embodiments, there is at least a second fluid process stream flowing through the process zone; and at least a second variable-resistance power-recovery turbine. A portion of the second process stream flows through the second power-recovery turbine to generate recovered electric power as direct current therefrom. The second power recovery turbine is electrically connected to the single DC to AC inverter.

In some embodiments, there is a DC bus electrically connected to the first and/or second power-recovery turbines and to the DC to AC inverter.

In some embodiments, the power-recovery turbines comprise adjustable guide vane power-recovery turbines or variable load power-recovery turbines, or combinations thereof.

The apparatus can be used in a wide variety of processes, including, but not limited to, at least one of an alkylation zone, a separation zone, an isomerization zone, a catalytic reforming zone, a fluid catalyst cracking zone, a hydrocracking zone, a hydrotreating zone, a hydrogenation zone, a dehydrogenation zone, an oligomerization zone, a desulfurization zone, an alcohol to olefins zone, an alcohol to gasoline zone, an extraction zone, a distillation zone, a sour water stripping zone, a liquid phase adsorption zone, a hydrogen sulfide reduction zone, an alkylation zone, a transalkylation zone, a coking zone, and a polymerization zone.

In some embodiments, there are three or more power-recovery turbines electrically connected to the DC to AC inverter.

In some embodiments, there may be more than one DC to AC inverter, with each of the DC to AC inverters electrically connected to one or more power-recovery turbines. The grid output of each of the DC to AC inverters is electrically connected to a low voltage (e.g., <600VAC) power. The power grids can be the same for all of the DC to AC inverters or they can be different.

In some embodiments, the substation comprises at least one alternating current bus, and the output of the DC to AC inverter is electrically connected to the at least one alternating current bus, such as a low voltage (e.g., <600VAC) bus, in the substation.

In some embodiments, the substation comprises at least one alternating current bus, and the output of the DC to AC inverter is electrically transformed up to medium voltage and then connected to a medium voltage (e.g., 5 kVAC or 15 kVAC Class) bus within the process sub station.

In some embodiments, there is a second substation, and the output of the first substation is electrically connected to the second substation. In some embodiments, the second substation has a higher voltage than a voltage of the first substation, and there is a step-up transformer to step-up the voltage of the DC to AC inverter to the higher voltage of the second substation, such as a medium voltage.

In some embodiments, the first substation is electrically connected to at least two petroleum, petrochemical, or chemical process zones. In some embodiments, the output of the first substation is electrically connected to a piece of equipment in the at least two process zones.

Another aspect of the invention is a process for recovering energy from a petroleum, petrochemical, or chemical plant. In one embodiment, the process comprises providing at least a first fluid process streams in a petroleum, petrochemical, or chemical process zone; controlling a flow rate of the first process stream by directing at least a portion of the first process stream through the first power-recovery turbine to generate recovered electric power as direct current therefrom; converting the recovered direct current into recovered alternating current in a single DC to AC inverter; and providing the recovered alternating current to a first sub station.

In some embodiments, the first substation is electrically connected to a piece of equipment in the process zone.

In some embodiments, the first substation is electrically connected to at least two petroleum, petrochemical, or chemical process zones. In some embodiments, the process includes providing the recovered alternating current to a piece of equipment in the at least two process zones.

In some embodiments, the process comprises providing at least a second fluid process stream flowing through the process zone; controlling a flow rate of the second process stream by directing at least a portion of the second process stream through at least a second variable-resistance power-recovery turbine to generate recovered electric power as direct current therefrom; combining the direct current from the first and second power recovery turbines; and converting the combined recovered direct current into the recovered alternating current in the DC to AC inverter.

In some embodiments, combining the recovered direct current from the first and second power-recovery turbines comprises combining the recovered direct current from the first and second power-recovery turbines in a DC bus electrically connected to the first and second power-recovery turbines and to the DC to AC inverter.

In some embodiments, the process substation comprises at least one alternating current bus, and wherein the output of the DC to AC inverter is electrically connected to the at least one alternating current bus.

In some embodiments, there is a second substation, and the output of the first substation is electrically connected to the second substation.

In some embodiments, the second substation has a higher voltage than a voltage of the first substation, and the process further comprises stepping up the output of the DC to AC inverter to the higher voltage of the second substation.

In some embodiments, the process also comprises receiving information from the external power grid and a plurality of pressure reducing devices, the plurality of pressure reducing devices comprising: one or more power-recovery turbines; a control valve; or, both; determining a power loss value or a power generated value for each of the pressure reducing devices; determining a total power loss value or a total power generated value based upon the power loss values or the power generated values from each of the pressure reducing devices; and, displaying the total power loss value or the total power generated value on at least one display screen.

In some embodiments, the process also comprises adjusting at least one process parameter in the processing zone based upon the total power loss value or the total power generated value.

In some embodiments, the process also comprises displaying the total power loss value or the total power generated value on at least one display screen.

In some embodiments, the process comprises, after the at least one process parameter has been adjusted, determining an updated power loss value or an updated power generated value for each of the pressure reducing devices; determining an updated total power loss value or an updated total power generated value for the process zone based upon the updated power loss values or the updated power generated values from each of the pressure reducing devices; and, displaying the updated total power loss value or the updated total power generated value on at least one display screen.

In some embodiments, the process also comprises receiving information associated with conditions outside of the process zone, wherein the total power loss value or the total power generated value is determined based in part upon the information associated with conditions outside of the process zone.

In some embodiments, the process also comprises receiving information associated with a throughput of the process zone, wherein the total power loss value or the total power generated value is determined based in part upon the information associated with the throughput of the process zone.

In some embodiments, the process also comprises maintaining the throughput of the process zone while adjusting the at least one process parameter of the portion of a process zone based upon the total power loss value or the total power generated value.

The power will be generated via power-recovery turbines with variable resistance to flow made possible by either guide vanes or variable load on the electrical power generation circuit. The power emanating from the turbines will be DC and can be combined into a single line and sent to an inverter that converts the DC power to AC in sync with and at the same voltage as a power grid. Because the power-recovery turbines produce DC output, it allows their electrical current to be combined without concern for synchronizing frequencies, rotational speeds, etc. for the controlling power-recovery turbines that may have fluctuating and variable rotational speeds individually.

In some embodiments, the process for controlling a flowrate of and recovering energy from a process stream in a processing unit comprises directing a portion of the process stream through one or more variable-resistance power-recovery turbines to control the flowrate of the process stream using a variable nozzle turbine, inlet variable guide vanes, or direct coupled variable electric load, to name a few, to vary the resistance to flow through the turbine.

The resistance to rotation of the variable-resistance turbine can be varied by an external variable load electric circuit which is in a magnetic field from a magnet(s) that is rotating on the turbine. As more load is put on the circuit, there is more resistance to rotation on the turbine. This in turn imparts more pressure drop across the turbine and slows the process stream flow. An algorithm in the device can also calculate the actual flow through the device by measuring the turbine RPM's and the load on the circuit. The resistance to rotation flow can also be varied by variable position inlet guide vanes. In some embodiments, the power will be generated via power-recovery turbines with variable resistance to flow made possible by either guide vanes or variable load on the electrical power generation circuit. An algorithm to calculate actual flow using the guide vanes position, power output and RPM's can be used.

If slow control response of the turbine is an issue, then the use of the turbine is limited to slow responding or "loose" control point applications. A slow responding application is contemplated to have a response time to reach half way (i.e., 50% of a difference) between a new (or target) steady state condition (e.g., temperature, pressure, flow rate) from an original (or starting) steady state condition when the new (or target) condition differs from the original (or stating) condition of at least 10%, of at least one second, or even greater, for example, ten seconds, at least one minute, at least ten minutes, or an hour or more, for half of the change to completed.

The power grid comprises a power grid internal to the process substation, a power grid external to the process substation, or both. When the power grid is internal to the process substation, the output of the DC to AC inverter can be used in the process substation directly. For example, there may be one or more alternating current buses in the process substation. Alternatively, when the power grid is external to the process substation, it may be at a higher voltage than the process substation. In this case, there is a transformer at the process substation that steps-up the output of the DC to AC inverter to the higher voltage of the power grid external to the process substation.

FIG. 1 illustrates an electrical connection diagram of an embodiment of the process 1 of the present invention. Power-recovery turbines 5A, 5B, 5C, 5D are direct coupled to synchronous generators 10A, 10B, 10C, 10D respectively. The AC currents generated are converted to DC by rectifiers 15A, 15B, 15C, 15D and then combined onto the DC bus. The DC current is sent to inverter 20 wherein it is converted back to AC current. The AC current is conditioned by sine-filter, DC choke and RFI suppression filter 25 before it is sent to AC bus 45. Closure of inverter main contactor 30, main switch 35 and circuit breaker 40 enables this action. If the power recovered exceeds the capacity of the substation low voltage bus, an optional step-up transformer 50 (shown with dashed lines) can be installed to transform the low voltage to medium voltage. As shown, AC bus 45 (either low voltage or medium voltage) can be connected to one or more pieces of equipment in the process zone or zones to which the substation is connected.

Figure 2:
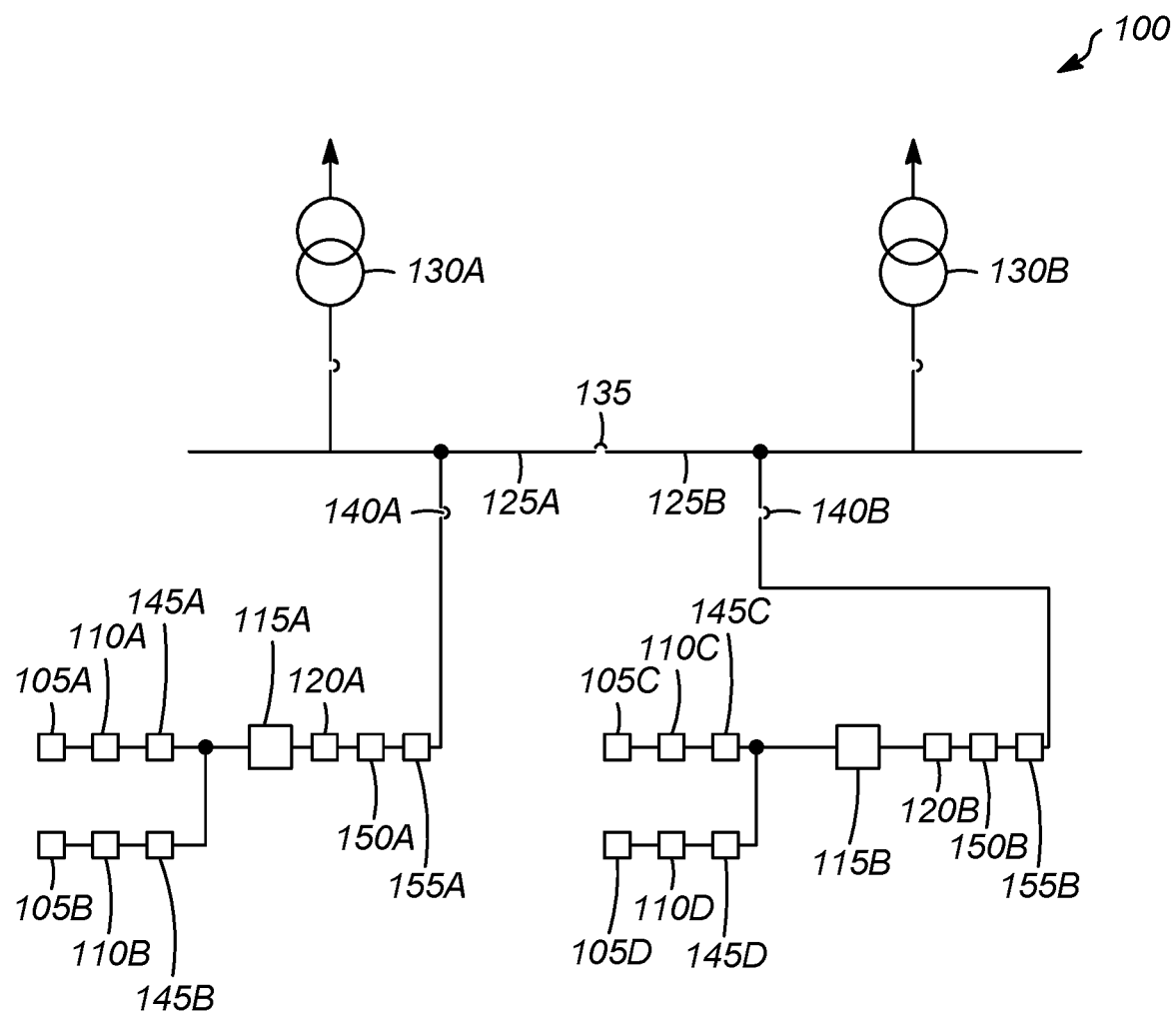
FIG. 2 is an electrical connection diagram of another embodiment of the present invention.

FIG. 2 illustrates an electrical connection diagram of a second embodiment of the process 100 of the present invention. Power-recovery turbines 105A and 105B are direct coupled to synchronous generators 110A and 110B respectively. The AC currents generated are converted to DC by rectifiers 145A and 145B and then combined onto the DC bus. The DC current is sent to inverter 115A wherein it is converted back to AC current. The AC current is conditioned by sine-filter, DC choke and RFI suppression filter 120A before it is sent to AC bus 125A. Closure of inverter main contactor 150A, main switch 155A and circuit breaker 140A enables this action.

Another branch has a similar arrangement of power-recovery turbines 105C and 105D with direct coupled synchronous generators 110C and 110D. The AC currents generated are converted to DC by rectifier 145C and 145D and then combined onto the DC bus. The DC current is sent to inverter 115B wherein it is converted back to AC current. The AC current is conditioned by sine-filter, DC choke and RFI suppression filter 120B before it is sent to AC bus 125B. Closure of inverter main contactor 150B, main switch 155B and circuit breaker 140B enables this action.

As shown, AC bus 125A and 125B are connected to transformers 130A and 130B respectively, and are separated by a normally-open tie circuit breaker 135. This arrangement is a typical secondary-selective distribution system common in large industrial plants.

AC bus 125A and/or 125B can be connected to one or more pieces of equipment in the process zone or zones to which the substation is connected.

The devices and processes of the present invention are contemplated as being utilized in a petroleum, petrochemical, or chemical process zone. As is known, such petroleum, petrochemical, or chemical process zone units utilize a process control system, typically on a computer in a control center.

The process control system described in connection with the embodiments disclosed herein may be implemented or performed on the computer with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, the processor may be any conventional processor, controller, microcontroller, or state machine. A processor may also be a combination of computing devices, e.g., a combination of a DSP and a microprocessor, two or more microprocessors, or any other combination of the foregoing.

The steps of the processes associated with the process control system may be embodied in an algorithm contained directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is in communication with the processor such the processor reads information from, and writes information to, the storage medium. This includes the storage medium being integral to or with the processor. The processor and the storage medium may reside in an ASIC. The ASIC may reside in a user terminal. Alternatively, the processor and the storage medium may reside as discrete components in a user terminal. These devices are merely intended to be exemplary, non-limiting examples of a computer readable storage medium. The processor and storage medium or memory are also typically in communication with hardware (e.g., ports, interfaces, antennas, amplifiers, signal processors, etc.) that allow for wired or wireless communication between different components, computers processors, or the like, such as between the input channel, a processor of the control logic, the output channels within the control system and the operator station in the control center.

In communication relative to computers and processors refers to the ability to transmit and receive information or data. The transmission of the data or information can be a wireless transmission (for example by Wi-Fi or Bluetooth) or a wired transmission (for example using an Ethernet RJ45 cable or an USB cable). For a wireless transmission, a wireless transceiver (for example a Wi-Fi transceiver) is in communication with each processor or computer. The transmission can be performed automatically, at the request of the computers, in response to a request from a computer, or in other ways. Data can be pushed, pulled, fetched, etc., in any combination, or transmitted and received in any other manner.

According to the present invention, therefore, it is contemplated that the process control system receives information from the power recovery turbines 105A, 105B, 105C, 105D relative to an amount of electricity generated by the power recovery turbines 105A, 105B, 105C, 105D. It is contemplated that the power recovery turbines 105A, 105B, 105C, 105D determine (via the processor) the amount of electricity it has generated. Alternatively, the process control system receiving the information determines the amount of electricity that has been generated by the power recovery turbines 105A, 105B, 105C, 105D. In either configuration, the amount of the electricity generated by the power recovery turbines 105A, 105B, 105C, 105D is displayed on at least one display screen associated with the computer in the control center. If the petroleum, petrochemical, or chemical process zone comprises a plurality of power recovery turbines 105A, 105B, 105C, 105D, it is further contemplated that the process control system receives information associated with the amount of electricity generated by each of the power recovery turbines 105A, 105B, 105C, 105D. The process control system determines a total electrical power generated based upon the information associated with the each of the power recovery turbines 105A, 105B, 105C, 105D and displays the total electrical power generated on the display screen. The total electrical power generated may be displayed instead of, or in conjunction with, the amount of electrical power generated by the individual power recovery turbines 105A, 105B, 105C, 105D.

As discussed above, the electrical energy recovered by the power recovery turbines 105A, 105B, 105C, 105D is often a result of removing energy from the streams that was added to the streams in the processing unit. Thus, it is contemplated that the processes according to the present invention provide for the various processing conditions associated with the petroleum, petrochemical, or chemical process zone to be adjusted into order to lower the energy added to the steam(s).

It is contemplated that the process control system receives information associated with the throughput of the petroleum, petrochemical, or chemical process zone, and determines a target electrical power generated value for the turbine(s) since the electricity represents energy that is typically added to the overall petroleum, petrochemical, or chemical process zone. The determination of the target electrical power generated value may be done when the electricity is at or near a predetermined level. In other words, if the amount of electricity produced meets or exceeds a predetermined level, the process control system can determine one or more processing conditions to adjust and lower the amount of electricity generated until it reaches the target electrical power generated value.

Thus, the process control system will analyze one or more changes to the various processing conditions associated with the petroleum, petrochemical, or chemical process zone to lower the amount of energy recovered by the turbines of the petroleum, petrochemical, or chemical process zone. Preferably, the processing conditions are adjusted without adjusting the throughput of the processing unit. This allows for the petroleum, petrochemical, or chemical process zone to have the same throughput, but with a lower operating cost associated with the same throughput. The process control software may calculate and display the difference between the target electrical power generated value and the total electrical power generated on the display screen.

For example, the process control software may recognize that the total electrical power generated exceeds a predetermined level. Accordingly, the process control software may determine the target electrical power generated value. Based upon other data and information received from other sensors and data collection devices typically associated with the petroleum, petrochemical, or chemical process zone, the process control software may determine that the amount of fuel consumed in a piece of equipment can be lowered. While maintaining the throughput of the petroleum, petrochemical, or chemical process zone, the amount of fuel consumed in the piece of equipment is lowered. While this may lower the electricity generated by the turbine, the lower fuel consumption provides a lower operating cost for the same throughput.

Thus, not only does the present process convert energy that is typically lost into a form that is used elsewhere in the petroleum, petrochemical, or chemical process zone, the petroleum, petrochemical, or chemical process zone is provided with opportunities to lower the energy input associated with the overall petroleum, petrochemical, or chemical process zone and increase profits by utilizing more energy efficient processes.

It should be appreciated and understood by those of ordinary skill in the art that various other components, such as valves, pumps, filters, coolers, etc., were not shown in the drawings as it is believed that the specifics of same are well within the knowledge of those of ordinary skill in the art and a description of same is not necessary for practicing or understanding the embodiments of the present invention.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

Specific Embodiments

While the following is described in conjunction with specific embodiments, it will be understood that this description is intended to illustrate and not limit the scope of the preceding description and the appended claims.

A first embodiment of the invention is an apparatus for recovering energy in a petroleum, petrochemical, or chemical plant comprising a petroleum, petrochemical, or chemical process zone; at least a first fluid process stream flowing through the process zone; at least a first variable-resistance power-recovery turbine, a portion of the first process stream flowing through the first power-recovery turbine to generate recovered electric power as direct current therefrom; a single DC to AC inverter electrically connected to the first power-recovery turbine, the output of the DC to AC inverter electrically connected to a first substation. An embodiment of the invention is one, any or all of prior embodiments in this paragraph up through the first embodiment in this paragraph wherein the first substation is electrically connected to a piece of equipment in the process zone. An embodiment of the invention is one, any or all of prior embodiments in this paragraph up through the first embodiment in this paragraph further comprising at least a second fluid process stream flowing through the process zone; and at least a second variable-resistance power-recovery turbine, a portion of the second process stream flowing through the second power-recovery turbine to generate recovered electric power as direct current therefrom, the second power recovery turbine electrically connected to the single DC to AC inverter. An embodiment of the invention is one, any or all of prior embodiments in this paragraph up through the first embodiment in this paragraph further comprising a DC bus electrically connected to the first power-recovery turbine and to the DC to AC inverter. An embodiment of the invention is one, any or all of prior embodiments in this paragraph up through the first embodiment in this paragraph wherein the power-recovery turbine comprises an adjustable guide vane power-recovery turbine or a variable load power-recovery turbine, or combinations thereof. An embodiment of the invention is one, any or all of prior embodiments in this paragraph up through the first embodiment in this paragraph wherein the process zone comprises at least one of an alkylation zone, a separation zone, an isomerization zone, a catalytic reforming zone, a fluid catalyst cracking zone, a hydrocracking zone, a hydrotreating zone, a hydrogenation zone, a dehydrogenation zone, an oligomerization zone, a desulfurization zone, an alcohol to olefins zone, an alcohol to gasoline zone, an extraction zone, a distillation zone, a sour water stripping zone, a liquid phase adsorption zone, a hydrogen sulfide reduction zone, an alkylation zone, a transalkylation zone, a coking zone, and a polymerization zone. An embodiment of the invention is one, any or all of prior embodiments in this paragraph up through the first embodiment in this paragraph wherein there are three or more power-recovery turbines electrically connected to the DC to AC inverter. An embodiment of the invention is one, any or all of prior embodiments in this paragraph up through the first embodiment in this paragraph wherein the first substation comprises at least one alternating current bus, and wherein the output of the DC to AC inverter is electrically connected to the at least one alternating current bus. An embodiment of the invention is one, any or all of prior embodiments in this paragraph up through the first embodiment in this paragraph further comprising a second substation and wherein the output of the first substation is electrically connected to the second substation. An embodiment of the invention is one, any or all of prior embodiments in this paragraph up through the first embodiment in this paragraph wherein the second substation has a higher voltage than a voltage of the first substation, and further comprising a step-up transformer to step-up an output of the first substation to the higher voltage of the second substation. An embodiment of the invention is one, any or all of prior embodiments in this paragraph up through the first embodiment in this paragraph wherein the first substation is electrically connected to at least two petroleum, petrochemical, or chemical process zones. An embodiment of the invention is one, any or all of prior embodiments in this paragraph up through the first embodiment in this paragraph wherein an output of the first substation is electrically connected to a piece of equipment in the at least two process zones.

A second embodiment of the invention is a process for recovering energy from a petroleum, petrochemical, or chemical plant comprising providing at least a first fluid process stream in a petroleum, petrochemical, or chemical process zone; controlling a flow rate of the first process stream by directing at least a portion of the first process stream through a first variable-resistance power-recovery turbine to generate recovered electric power as direct current therefrom; converting the recovered direct current into recovered alternating current in a single DC to AC inverter; and providing the recovered alternating current to a first substation. An embodiment of the invention is one, any or all of prior embodiments in this paragraph up through the second embodiment in this paragraph wherein the first substation is electrically connected to a piece of equipment in the process zone. An embodiment of the invention is one, any or all of prior embodiments in this paragraph up through the second embodiment in this paragraph wherein the first substation is electrically connected to at least two petroleum, petrochemical, or chemical process zones. An embodiment of the invention is one, any or all of prior embodiments in this paragraph up through the second embodiment in this paragraph further comprising providing the recovered alternating current to a piece of equipment in the at least two process zones. An embodiment of the invention is one, any or all of prior embodiments in this paragraph up through the second embodiment in this paragraph further comprising providing at least a second fluid process stream flowing through the process zone; controlling a flow rate of the second process stream by directing at least a portion of the second process stream through at least a second variable-resistance power-recovery turbine to generate recovered electric power as direct current therefrom; combining the direct current from the first and second power recovery turbines; and converting the combined recovered direct current into the recovered alternating current in the DC to AC inverter. An embodiment of the invention is one, any or all of prior embodiments in this paragraph up through the second embodiment in this paragraph wherein the first substation comprises at least one alternating current bus, and wherein the output of the DC to AC inverter is electrically connected to the at least one alternating current bus. An embodiment of the invention is one, any or all of prior embodiments in this paragraph up through the second embodiment in this paragraph further comprising a second substation, and wherein the output of the first substation is electrically connected to the second substation. An embodiment of the invention is one, any or all of prior embodiments in this paragraph up through the second embodiment in this paragraph wherein the second substation has a higher voltage than a voltage of the first substation, and further comprising stepping up an output of the DC to AC inverter to the higher voltage of the second substation. An embodiment of the invention is one, any or all of prior embodiments in this paragraph up through the second embodiment in this paragraph further comprising receiving information from a plurality of pressure reducing devices, the plurality of pressure reducing devices comprising one or more power-recovery turbines, a control valve, or both; determining a power loss value or a power generated value for each of the pressure reducing devices; determining a total power loss value or a total power generated value based upon the power loss values or the power generated values from each of the pressure reducing devices; and displaying the total power loss value or the total power generated value on at least one display screen. An embodiment of the invention is one, any or all of prior embodiments in this paragraph up through the second embodiment in this paragraph further comprising adjusting at least one process parameter in the process zone based upon the total power loss value or the total power generated value. An embodiment of the invention is one, any or all of prior embodiments in this paragraph up through the second embodiment in this paragraph further comprising displaying the power loss value or the power generated value on the at least one display screen. An embodiment of the invention is one, any or all of prior embodiments in this paragraph up through the second embodiment in this paragraph further comprising after the at least one process parameter has been adjusted, determining an updated power loss value or an updated power generated value for each of the pressure reducing devices; determining an updated total power loss value or an updated total power generated value for the process zone based upon the updated power loss values or the updated power generated values from each of the pressure reducing devices; and displaying the updated total power loss value or the updated total power generated value on the at least one display screen. An embodiment of the invention is one, any or all of prior embodiments in this paragraph up through the second embodiment in this paragraph further comprising receiving information associated with conditions outside of the process zone, wherein the total power loss value or the total power generated value is determined based in part upon the information associated with conditions outside of the process zone. An embodiment of the invention is one, any or all of prior embodiments in this paragraph up through the second embodiment in this paragraph further comprising receiving information associated with a throughput of the process zone, wherein the total power loss value or the total power generated value is determined based in part upon the information associated with the throughput of the process zone. An embodiment of the invention is one, any or all of prior embodiments in this paragraph up through the second embodiment in this paragraph further comprising maintaining the throughput of the process zone while adjusting the at least one process parameter of the portion of a process zone based upon the total power loss value or the total power generated value.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. An apparatus for recovering energy in a petroleum, petrochemical, or chemical plant comprising:
    at least two petroleum, petrochemical, or chemical process zones in the petroleum, petrochemical, or chemical plant wherein the at least two process zones comprise at least two of an alkylation zone, a separation zone, an isomerization zone, a catalytic reforming zone, a fluid catalyst cracking zone, a hydrocracking zone, a hydrotreating zone, a hydrogenation zone, a dehydrogenation zone, an oligomerization zone, a desulfurization zone, an alcohol to olefins zone, an alcohol to gasoline zone, a distillation zone, a sour water stripping zone, a liquid phase adsorption zone, a hydrogen sulfide reduction zone, an alkylation zone, a transalkylation zone, a coking zone, or a polymerization zone;
    at least a first fluid process stream flowing through the at least one of the at least two process zones;
    at least a first variable-resistance power-recovery turbine, a portion of the first process stream flowing through the first power-recovery turbine to generate recovered electric power as direct current therefrom;
    a single DC to AC inverter electrically connected to the first power-recovery turbine, the output of the DC to AC inverter electrically connected to a first distribution substation for distributing the output of the DC to AC inverter to at least one of the at least two process zones.

2. The apparatus of claim 1 wherein the first distribution substation is electrically connected to a piece of equipment in at least one of the at least two process zones.

3. The apparatus of claim 1 further comprising:
at least a second fluid process stream flowing through the process zones; and
at least a second variable-resistance power-recovery turbine, a portion of the second process stream flowing through the second power-recovery turbine to generate recovered electric power as direct current therefrom, the second power recovery turbine electrically connected to the single DC to AC inverter.

4. The apparatus of claim 1 further comprising a DC bus electrically connected to the first power-recovery turbine and to the DC to AC inverter.

5. The apparatus of claim 1 wherein the power-recovery turbine comprises an adjustable guide vane power-recovery turbine or a variable load power-recovery turbine, or combinations thereof.

6. The apparatus of claim 1 wherein there are three or more power-recovery turbines electrically connected to the DC to AC inverter.

7. The apparatus of claim 1 wherein the first distribution substation comprises at least one alternating current bus, and wherein the output of the DC to AC inverter is electrically connected to the at least one alternating current bus.

8. The apparatus of claim 1 further comprising a second distribution substation and wherein the output of the first distribution substation is electrically connected to the second distribution substation.

9. The apparatus of claim 8 wherein the second distribution substation has a higher voltage than a voltage of the first substation, and further comprising a step-up transformer to step-up an output of the first distribution substation to the higher voltage of the second distribution substation.

10. A process for recovering energy from a petroleum, petrochemical, or chemical plant comprising:
providing at least a first fluid process stream in at least two petroleum, petrochemical, or chemical process zones in the petroleum, petrochemical, or chemical plant wherein the at least two process zones comprise at least one of an alkylation zone, a separation zone, an isomerization zone, a catalytic reforming zone, a fluid catalyst cracking zone, a hydrocracking zone, a hydrotreating zone, a hydrogenation zone, a dehydrogenation zone, an oligomerization zone, a desulfurization zone, an alcohol to olefins zone, an alcohol to gasoline zone, a distillation zone, a sour water stripping zone, a liquid phase adsorption zone, a hydrogen sulfide reduction zone, an alkylation zone, a transalkylation zone, a coking zone, or a polymerization zone;
controlling a flow rate of the first process stream by directing at least a portion of the first process stream through a first variable-resistance power-recovery turbine to generate recovered electric power as direct current therefrom;
converting the recovered direct current into recovered alternating current in a single DC to AC inverter; and
providing the recovered alternating current to a first distribution substation for distributing the output of the DC to AC inverter to at least one of the at least two process zones.

11. The process of claim 10 wherein the first distribution substation is electrically connected to a piece of equipment in at least one of the at least two process zones.

12. The process of claim 10 further comprising providing the recovered alternating current to a piece of equipment in at least one of the at least two process zones.

13. The process of claim 10 further comprising:
providing at least a second fluid process stream flowing through the at least two process zones;
controlling a flow rate of the second process stream by directing at least a portion of the second process stream through at least a second variable-resistance power-recovery turbine to generate recovered electric power as direct current therefrom;
combining the direct current from the first and second power recovery turbines; and
converting the combined recovered direct current into the recovered alternating current in the DC to AC inverter.

14. The process of claim 10 wherein the first substation comprises at least one alternating current bus, and wherein the output of the DC to AC inverter is electrically connected to the at least one alternating current bus.

15. The process of claim 10 further comprising a second substation, and wherein the output of the first substation is electrically connected to the second substation.

16. The process of claim 15 wherein the second substation has a higher voltage than a voltage of the first substation, and further comprising stepping up an output of the DC to AC inverter to the higher voltage of the second substation.

17. The process of claim 10 further comprising:
receiving information from a plurality of pressure reducing devices, the plurality of pressure reducing devices comprising: one or more power-recovery turbines; a control valve; or, both;
determining a power loss value or a power generated value for each of the pressure reducing devices;
determining a total power loss value or a total power generated value based upon the power loss values or the power generated values from each of the pressure reducing devices; and,
displaying the total power loss value or the total power generated value on at least one display screen.

18. The process of claim 17 further comprising adjusting at least one process parameter in the at least two process zones based upon the total power loss value or the total power generated value.

19. The process of claim 17 further comprising displaying the power loss value or the power generated value on the at least one display screen.

20. The process of claim 18 further comprising:
after the at least one process parameter has been adjusted, determining an updated power loss value or an updated power generated value for each of the pressure reducing devices;
determining an updated total power loss value or an updated total power generated value for the at least two process zones based upon the updated power loss values or the updated power generated values from each of the pressure reducing devices; and,
displaying the updated total power loss value or the updated total power generated value on the at least one display screen.

21. The process of claim 17 further comprising:
receiving information on conditions outside of the at least two process zones, wherein the total power loss value or the total power generated value is determined based in part upon the information on conditions outside of the at least two process zones.

22. The process of claim 17 further comprising:
receiving information on a throughput of the at last two process zones, wherein the total power loss value or the total power generated value is determined based in part upon the information on the throughput of the at least one process zones.

23. The process of claim 22 further comprising:
  maintaining the throughput of the at least two process zones while adjusting the at least one process parameter of the at least two process zones based upon the total power loss value or the total power generated value.

* * * * *